United States Patent [19]

Miyoshi et al.

[11] Patent Number: 4,643,941
[45] Date of Patent: Feb. 17, 1987

[54] MAGNETIC RECORDING MEDIUM

[75] Inventors: Takahito Miyoshi; Masaaki Fujiyama, both of Kanagawa, Japan

[73] Assignee: Fuji Photo Film Co., Ltd., Kanagawa, Japan

[21] Appl. No.: 724,723

[22] Filed: Apr. 18, 1985

[30] Foreign Application Priority Data

Apr. 18, 1984 [JP] Japan .................................. 59-77882

[51] Int. Cl.$^4$ ........................... G11B 5/70; G11B 5/62
[52] U.S. Cl. ................................... 428/323; 427/131; 428/336; 428/694; 428/900
[58] Field of Search ............... 428/694, 900, 323, 332, 428/336; 427/128, 131; 360/134

[56] References Cited

U.S. PATENT DOCUMENTS

| | | | |
|---|---|---|---|
| 4,259,392 | 3/1981 | Suzuki | 428/694 |
| 4,455,345 | 6/1984 | Miyatuka et al. | 428/694 |
| 4,493,874 | 1/1985 | Kubo et al. | 428/694 |
| 4,511,617 | 4/1985 | Hideyama et al. | 428/694 |
| 4,513,054 | 4/1985 | Kitamoto et al. | 428/694 |
| 4,565,726 | 1/1986 | Oguchi et al. | 428/694 |

Primary Examiner—Paul J. Thibodeau
Attorney, Agent, or Firm—Sughrue, Mion, Zinn, Macpeak and Seas

[57] ABSTRACT

A magnetic recording medium is disclosed which comprises a non-magnetic support having provided thereon a magnetic layer, the magnetic layer comprising a first magnetic layer provided on the non-magnetic support containing ferromagnetic alloy particles and a second magnetic layer provided on the first magnetic layer containing hexagonal crystallized ferrite type magnetic particles, wherein the second magnetic layer has a thickness of 0.5 μm or less.

19 Claims, 1 Drawing Figure

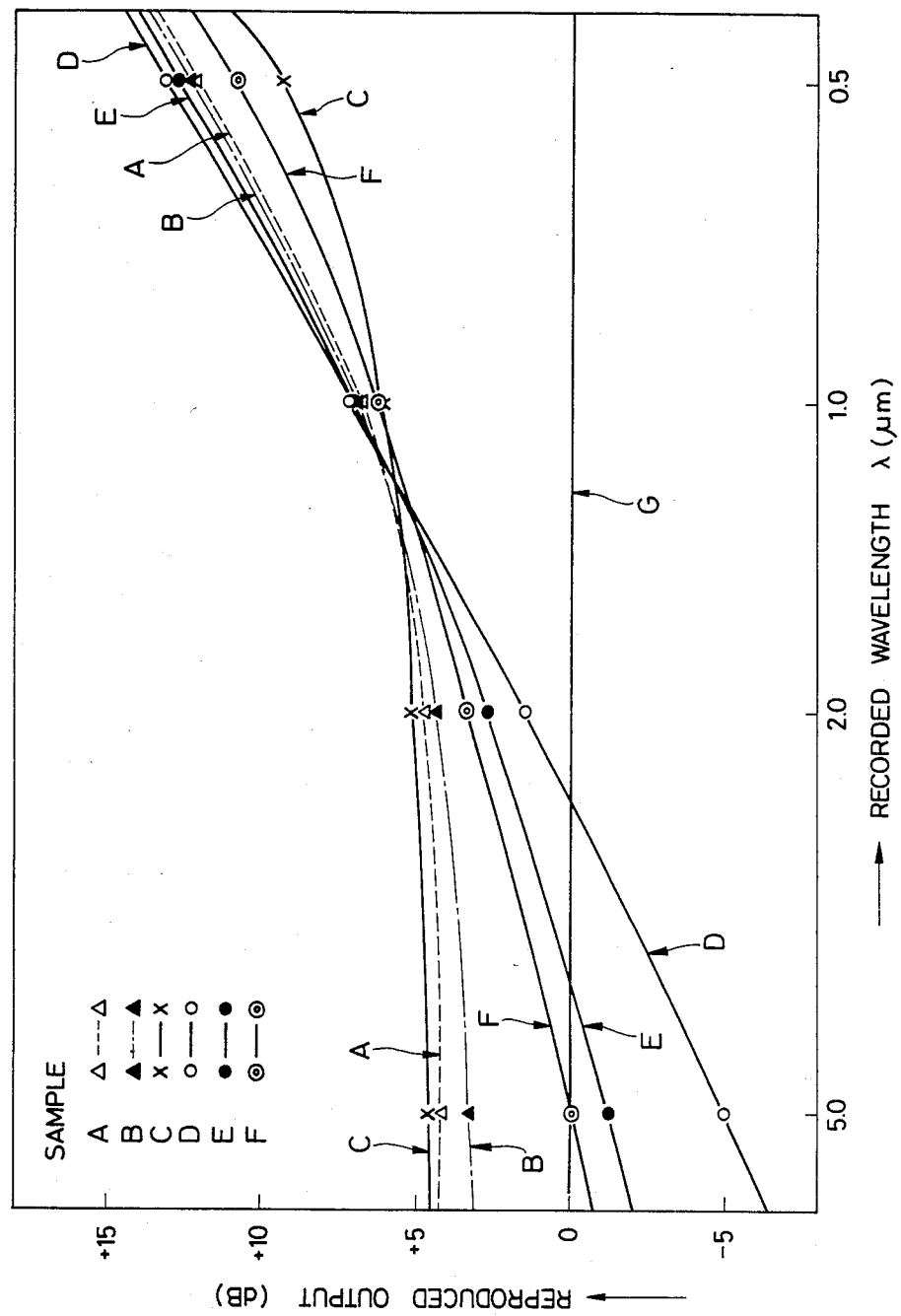

MAGNETIC RECORDING MEDIUM

FIELD OF THE INVENTION

The present invention relates to a magnetic recording medium and more particularly, it relates to a magnetic recording medium having higher reproduced output in a wide region, from long wave length to short wave length, and having excellent running durability.

BACKGROUND OF THE INVENTION

Magnetic recording medium comprising a non-magnetic support having coated thereon a magnetic coating composition having dispersed therein ferromagnetic particles consisting of acicular crystals such as Co-containing magnetic iron oxide or $CrO_2$ has been widely used for magnetic recording and replaying. However, improvements of recording density have recently been strongly required. As a result, it has been attempted to make particles of Co-containing magnetic iron oxide finer and finer. However, such particles have not proven satisfactory for increased reproduced output in a high frequency region of shorter wavelength. The reproduced output has been considerably improved by adding ferromagnetic alloy particles to the magnetic layer. However, when ferromagnetic alloy particles are only included in the magnetic layer, there is a disadvantage that better running durability cannot be obtained.

Ferromagnetic particles of tabular hexagonal ferrite type has recently been developed. In the magnetic recording medium using ferromagnetic particles of this type, output in a high frequency region of shorter wave length is high, but the output in a low frequency region of longer wavelength is low.

In order to overcome the above disadvantage, it has been proposed in Japanese Patent Application (OPI) No. 212623/82 that magnetic particles of barium ferrite type and magnetic particles of $\gamma$-$Fe_2O_3$ type be included in combination in the magnetic layer. (The term "OPI" as used herein means a "published unexamined Japanese patent application".) Yet, higher output in the entire frequency region cannot be obtained by this method.

Inventors of the present invention have produced a magnetic tape by mixing ferromagnetic alloy particles and magnetic particles of hexagonal crystallized ferrite type and have found no remarkable improvements of reproduced output.

The inventors have made extensive researches as to the combination of materials of ferromagnetic metal particles and magnetic particles of barium ferrite type and the construction of the magnetic layer. As a result, it has been found that high output from a low frequency region to a high frequency region can be obtained and running durability can unexpectedly be improved when on a first magnetic layer containing ferromagnetic alloy particles, a second extremely thin magnetic layer containing magnetic particles of hexagonal crystallized ferrite type is provided.

SUMMARY OF THE INVENTION

An object of the present invention is to provide a magnetic recording medium having higher reproduced output from a low frequency region to a high frequency region and having excellent running durability.

BRIEF DESCRIPTION OF DRAWING

The FIGURE shows a relationship between reproduced output and recorded wave length.
In the FIGURE symbols indicate the following.
A: tape sample of Example 1
B: tape sample of Example 2
C: tape sample of Comparative Example 1
D: tape sample of Comparative Example 2
E: tape sample of Comparative Example 3
F: tape sample of Comparative Example 4
G: reference tape

DETAILED DESCRIPTION OF THE INVENTION

The object of the present invention can be achieved by a magnetic recording medium comprising a non-magnetic support having coated thereon a magnetic layer, the magnetic layer comprising a first magnetic layer containing ferromagnetic alloy particles provided on the non-magnetic support and a second magnetic layer containing magnetic particles of hexagonal crystallized ferrite type on the first magnetic layer wherein the second magnetic layer has a thickness of 0.5 $\mu$m or less provided.

The ferromagnetic alloy particles used in the first magnetic layer of the present invention have a metal content of 75 wt.% or more, 80 wt.% or more of the metal content is at least one kind of ferromagnetic metal (that is, Fe, Co, Ni, Fe-Co, Fe-Ni, Co-Ni or Co-Ni-Fe) and 20 wt.% of the metal content is Al, Si, S, Sc, Ti, V, Cr, Mn, Cu, Zn, Y, Mo, Rh, Pd, Ag, Sn, Sb, Te, Ba, Ta, W, Re, Au, Hy, Pb, Bi, La, Ce, Pr, Nd, B or P. A slight amount (about 3 wt% or less) of water, hydroxides or oxides can be included.

The specific surface area of the ferromagnetic alloy particles is preferably 35 m$^2$/g ($S_{BET}$) or more, and more preferably 45 m$^2$/g ($S_{BET}$) or more. If it is less than 35 m$^2$/g ($S_{BET}$), higher reproduced output cannot be obtained.

The thickness of the first magnetic layer is preferably 10 $\mu$m or less, more preferably 5 $\mu$m or less. If the thickness is more than 10 $\mu$m, adhesive strength of the magnetic layer deteriorates and the magnetic thin tape suitable for a long period of time cannot be obtained.

The ferromagnetic particles used in the second magnetic layer of the present invention are hexagonal crystallized ferrite particles such as barium ferrite, strontium ferrite, lead ferrite, substituted calcium ferrites, manganese bismuth or a hexagonal crystallized cobalt alloy thereof. Particularly preferred ferromagnetic particles are Co-substituted barium ferrite and Co-substituted strontium ferrite. Ferromagnetic particles of hexagonal crystallized tabular shape in this invention have a tabular diameter (average particle diameter) of 0.01 to 10 $\mu$m and particularly preferably 0.03 to 0.10 $\mu$m. The tabular thickness (average thickness) thereof is 0.005 to 5 $\mu$m, and most preferably 0.015 to 0.05 $\mu$m.

The tabular ratio (tabular diameter/tabular thickness) is 2 or more, most preferably 3 to 10.

In the present invention, output in a wide wave length region, that is, from the longer wave length to the shorter wave length can be improved by providing a first magnetic layer and a second thin magnetic layer. The reason may be that the second magnetic layer containing magnetic particles of hexagonal crystallized ferrite type does not contribute much in the longer wave length region because the second magnetic layer is extremely thin and that the first magnetic layer containing ferromagnetic alloy particles contributes much because the first magnetic layer is thick. It is also considered that the second magnetic layer containing magnetic particles of hexagonal crystallized ferrite type contributes in the shorter wave length region even though the second magnetic layer is a thin layer. On the contrary, if the upper layer of the magnetic layer containing magnetic particles of hexagonal crystallized ferrite type is thick, it is believed that it prevents the contribution of the upper layer of the magnetic layer.

In the present invention, running durability can remarkably be improved by providing the first and second magnetic layers. The reason may be that clogging of a magnetic head readily appears with only a first magnetic layer containing ferromagnetic alloy particles and also rust readily appears and that such clogging or rust is prevented by providing the second magnetic layer, which acts as a protective layer.

The ratio of the thickness of the upper layer or the second magnetic layer and that of the under layer or the first magnetic layer is that the ratio of the upper layer (second magnetic layer)/the under layer (first magnetic layer) is preferably 1/10 or less, more preferably 1/20 or less.

The thickness of the second magnetic layer or the upper layer is preferably 0.5 μm or less, more preferably 0.1 μm or less and most preferably 0.03 μm or less.

Binders and additives can be included in the first magnetic layer containing ferromagnetic alloy particles and in the second magnetic layer containing magnetic particles of hexagonal crystallized ferrite type.

The binders used in the present invention are those generally used such as thermoplastic resins, thermosetting resins, reactive type resins and the mixture thereof.

The thermoplastic resins are those having a softening point of 150° C. or less, an average molecular weight of 10,000 to 200,000 and a degree of polymerization of about 200 to 2,000 such as a copolymer of vinyl chloride and vinyl acetate, a copolymer of vinyl chloride, vinyl acetate and maleic acid, a copolymer of vinyl chloride and vinylidene chloride, a copolymer of vinyl chloride and acrylonitrile, a copolymer of acrylate and acrylonitrile, a copolymer of acrylate and vinylidene chloride, a copolymer of acrylate and styrene, a copolymer of methacrylate and acrylonitrile, a copolymer of methacrylate and vinylidene chloride, a copolymer of methacrylate and styrene, urethane elastomer, polyvinyl fluoride, a copolymer of vinylidene chloride and acrylonitrile, a copolymer of butadiene and acrylonitrile, a polyamide resin, polyvinyl butyral, cellulose derivatives (that is, cellulose acetate butyrate, cellulose diacetate, cellulose triacetate, cellulose propionate, nitrocellulose and the like), a copolymer of styrene and butadiene, a polyester resin, thermoplastic resins of various synthetic rubber type (that is, polybutadiene, polychloroprene, polyisoprene, a copolymer of styrene and butadiene and the like) and the mixture thereof.

Thermosetting resins or reactive type resins have a molecular weight of 200,000 or less in a state of a coating composition and the molecular wieght becomes infinite by the condensation reaction or the addition reaction when the coating composition is coated and dried. Of those resins, the resins which do not soften or melt until the resins are heat-decomposed are preferred. Specific examples of the resins are phenol and formalin (novolac) resins, phenol and formmalin (resol) resins, phenol and furfural resins, xylene and formaldehyde resins, urea resins, melamine resins, dry oil modified alkyd resins, phenol resin modified alkyd resins, maleic acid resin modified alkyd resins, unsaturated polyester resins, epoxy resins and hardening agents (e.g., polyamine, acid anhydride, polyamide resins and the like), polyester resins curable with moisture having isocyanate group at the end of the molecule, polyether resins curable with moisture having isocyanate group at the end of the molecule, polyisocyanate prepolymer (a compound having at least three isocyanate groups in one molecule obtained by the reaction of diisocyanate and low molecular weight triol, trimer and tetramer of diisocyanate), polyisocyanate prepolymer and resins having active hydrogen (e.g., polyester polyol, polyether polyol, copolymers of acrylic acid, copolymers of maleic acid, copolymers of 2-hydroxy ethyl methacrylate, copolymers of parahydroxy styrene and the like) and the mixture thereof.

These resins as a binder can be used alone or in combination. Additives can be included. The mixing weight ratio of ferromagnetic alloy particles or magnetic particles of hexagonal crystallized ferrite type and the binders is that 8 to 400, preferably 10 to 200 parts by weight of the binder are used based on 100 parts by weight of ferromagnetic particles.

The dispersing agents (wetting agents for pigment) are a fatty acid having 12 to 18 carbon atoms ($R_1COOH$, where $R_1$ is an alkyl or an alkenyl group having 11 to 17 carbon atoms) such as caprylic acid, capric acid, lauric acid, myristic acid, palmitic acid, stearic acid, oleic acid, elaidic acid, linolic acid, linolenic acid or stearol acid; metal soap consisting of alkali metal (e.g., Li, Na, K and the like) or alkaline earth metal (Mg, Ca, Ba) of the fatty acid; a fluorine-containing ester of the fatty acid; an amide of the fatty acid; polyalkylene oxide alkyl phosphate; lecithin; trialkyl polyolefin oxyquaternary ammonium salt (alkyl group having 1 to 5 carbon atoms, olefin such as ethylene, propylene and the like). In addition to the above, higher alcohols having 12 or more of carbon atoms and sulfates can be also used. These dispersing agents can be used in an amount of 0.5 to 20 parts, preferably 0.5 to 2 parts, by weight based on 100 parts by weight of the binders.

The antistatic agents used in the present invention are electroconductive fine particles such as carbon black or carbon black graft polymer; natural surface active agents such as saponin; nonionic surface active agents such as alkylene oxide type agent, a glycerine type agent or glycidol type agent; cationic surface active agents such as higher alkyl amines, quaternary ammonium salts, pyridine and other heterocyclic compounds, phosphonium or sulfonium; anionic surface active agents such as carboxylic acid, a sulfonic acid, a phosphoric acid or a compound having an acid group of sulfate or phosphate; and amphoteric surface active agents such as amino acid, amino sulphonic acids or a sulfate or a phosphate of aminoalcohol.

The above electroconductive fine particles are used in an amount of 0.2 to 20 parts, preferably 0.2 to 10 parts, by weight based on 100 parts by weight of the binder. The above surface active agents are used in an amount of 0 to 10 parts, preferably 0 to 5 parts, by weight based on 100 parts of the binder.

These surface active agents can be used alone or in combination. These agents are used as an antistatic agent but are sometimes used for improving the dispersion of magnetic particles, the magnetic characteristics, the lubricating properties or act as a coating aid.

The first and second magnetic layers are prepared by mixing, kneading and dispersing ferromagnetic alloy particles or magnetic particles of hexagonal crystallized ferrite type, binders, additives and solvents, coating the resulting coating composition, which is subjected to magnetic orientation and is dried.

The magnetic coating composition is prepared by mixing and kneading ferromagnetic alloy particles, or magnetic particles of hexagonal crystallized ferrite type, binders, dispersing agents, lubricating agents, antistatic agents, lubricating agents and solvents.

Ferromagnetic particles and the above-described compositions are added into a mixing and kneading device simultaneously or one after another. For example, ferromagnetic particles are added into a solvent containing a dispersing agent and they are mixed and kneaded for a predetermined period of time to prepare a coating composition.

Various kneading devices are used for mixing, kneading and dispersing the coating composition. The kneading devices are a two roll mill, a three roll mill, a ball mill, a pebble mill, a trommel, a sand grinder, Szegvari attriter, a high speed impeller dispersing device, a high speed stone mill, a high speed impact mill, a disperser, a kneader, a high speed mixer, a homogenizer and a ultrasonic dispersing device.

The art of mixing, kneading and dispersing is disclosed in T. C. PATTON, *Paint Flow And Pigment Dispersing* (1964), John Wiley & Sons.), as well as in U.S. Pat. Nos. 2,581,414 and 2,855,156.

The methods for coating a magnetic layer on a nonmagnetic support are an air doctor coating, a blade coating, a rod coating, an extrusion coating, an air knife coating, a squeeze coating, a dip coating, a reverse roll coating, a transfer roll coating, a gravure coating, a kiss coating, a cast coating, a spray coating and a spin coating, and another coating methods can be applied. Specific explanation thereof is given in *Coating Engineering* on pages 253 to 277 published by Asakura Shoten, Mar. 20, 1971.

The magnetic layer is coated so that the dry thickness is about 0.5 to 10 $\mu$m.

The magnetic layer thus coated on a support is subjected to magnetic orientation, if necessary, and is dried. Then, it is subjected to smoothing treatment, if necessary.

Conventionally used lubricating agents and abrasives can be incorporated in the second magnetic layer in a higher ratio than the first magnetic layer. For example, they can be added in an amount of 0 to 15% by weight based on the weight of the binder in the first magnetic layer and 1 to 20% by weight based on the weight of the binder in the second magnetic layer. The first and second layers can be coated simultaneously by a multicoating method. Detailed explanation is disclosed in Japanese Patent Application (OPI) Nos. 98803/73 corresponding to German Pat. No. DT-OS 2,309,159 and 99233/73 corresponding to West German Pat. No. DT-AS 2,309,158.

A backing layer can be provided, if necessary.

The present invention will be illustrated in more detail by the following non-limiting Example. In the Example, all parts are by weight.

EXAMPLE

The first magnetic layer was coated using the following composition on a polyethylene terephthalate film having a thickness of 10 $\mu$m to have a dry thickness of 3.5 $\mu$m.

| Composition for the First Magnetic Layer | |
|---|---|
| Ferromagnetic Alloy Particles (Fe—Ni alloy, Ni: about 5%) (Specific surface area $S_{BET}$: 45 m$^2$/g) | 100 parts |
| Copolymer of Vinyl Chloride, Vinyl Acetate and Maleic Anhydride (86:13:1 by weight %; weight average molecular weight: about 70,000; 400 × 110A, a trademark, manufactured by Nippon Zeon Co., Ltd.) | 11 parts |
| Urethane Resin ("N-2301" a trademark, manufactured by Nippon Polyurethane Co., Ltd.; a reaction product of a polyester and 4,4-diphenylmethane diisocyanate; weight average molecular weight: about 50,000) | 11 parts |
| Polyisocyanate ("Coronate L", a trademark, manufactured by Nippon Polyurethane Co., Ltd.) | 8 parts |
| Carbon Black (average particle diameter: 40 m$\mu$) | 2 parts |
| Methyl Ethyl Ketone | 300 parts |

On the first magnetic layer was coated a second magnetic layer to have a predetermined dry thickness, was subjected to calendering treatment and was slit to a width of ½ inch. The characteristics thereof were evaluated.

| Composition for the Second Magnetic Layer | |
|---|---|
| Ba Ferrite Magnetic Particles (tabular diameter (average particle diameter: 0.07 $\mu$m, average thickness: 0.02 $\mu$m) | 100 parts |
| Copolymer of Vinyl Chloride, Vinyl Acetate and Maleic Anhydride (400 × 110A, a trademark, manufactured by Nippon Zeon Co., Ltd.) | 8 parts |
| Urethane Resin ("N-2304", a trademark, manufactured by Nippon Polyurethane Co., Ltd.; a reaction product of a polyester and 4,4-diphenylmethane diisocyanate; weight average molecular weight: about 97,000) | 8 parts |
| Stearic Acid | 2 parts |
| Oleic Acid | 2 parts |
| Butyl Stearate | 2 parts |
| Cr$_2$O$_3$ Particles (average particle diameter: 0.2 $\mu$m) | 5 parts |
| Polyisocyante ("Coronate L", a trademark, manufactured by Nippon Polyurethane Co., Ltd.) | 8 parts |
| Methyl Ethyl Ketone | 600 parts |

COATING A SINGLE LAYER

A magnetic layer was coated to have a dry thickness of 3.5 $\mu$m on a polyethylene terephthalate film having a thickness of 10 $\mu$m using the following composition, subjected to calendering treatment and was slit to a width of ½ inch. The characteristics thereof were evaluated.

| Coating Composition | |
|---|---|
| Ferromagnetic Alloy Particles (Fe—Ni alloy, Ni: about 5%) (Specific surface area ($S_{BET}$: 45 m$^2$/g) | 100 parts |
| Ba Ferrite Magnetic Particles (tabular diameter (average particle diameter): 0.07 $\mu$m, average | 14 parts |

-continued

| Coating Composition | |
|---|---|
| thickness: 0.02 μm) | |
| Copolymer of Vinyl Chloride, Vinyl Acetate and Maleic Anhydride (400 × 110A, a trademark, manufactured by Nippon Zeon Co., Ltd.) | 13 parts |
| Urethane Resin ("N-2304", a trademark, manufactured by Nippon Polyurethane Co., Ltd.) | 13 parts |
| Polyisocyante ("Coronate L", a trademark, manufactured by Nippon Polyurethane Co., Ltd.) | 9 parts |
| Carbon Black (average diameter: 40 mμ) | 2 parts |
| Stearic Acid | 1 part |
| Oleic Acid | 1 part |
| Butyl Stearate | 1 part |
| Cr₂O₃ Particles (average particle diameter: 0.2 μm) | 3 parts |
| Methyl Ethyl Ketone | 350 parts |

Kinds of samples and the thickness thereof are shown in Table 1.

TABLE 1

| | Thickness of First Magnetic Layer (μm) | Thickness of Second Magnetic Layer (μm) | Tape Sample |
|---|---|---|---|
| Example 1 | 3.5 | 0.03 | A |
| Example 2 | 3.5 | 0.5 | B |
| Comparative Example 1 | 3.5 | — | C |
| Comparative Example 2 | — | 3.5 | D |
| Comparative Example 3 | 3.5 | 0.6 | E |
| Comparative Example 4 | 3.5 | Single Layer (ferromagnetic alloy particles and Ba ferrite were mixed) | F |

The above samples were mounted on VTR "V-500D", a trademark, manufactured by TOSHIBA Corporation using a ferrite head and made running at a half speed. The reproduced output at the predetermined recorded wavelength was measured.

As a reference tape, a regular tape using Cocontaining γ-iron oxide and having a width of ½ inch manufactured by Fuji Photo Film Co., Ltd. was used. This tape sample was identified as G. The results are shown in the Figure.

These samples mounted on the above described VTR were run repeatedly and were checked for head clogging at certain passes. The results are shown in Table 2.

TABLE 2

| Sample | Number of Passes on VTR Until Head Clogging Occurred |
|---|---|
| Example 1 | 100 passes or more |
| Example 2 | 100 passes or more |
| Comparative Example 1 | 10 passes |
| Comparative Example 2 | 100 passes or more |
| Comparative Example 3 | 100 passes or more |
| Comparative Example 4 | 10 passes |

It is apparent from the Figure that the tape of the present invention exhibits a remarkably higher reproduced output in a wide recorded wavelength region, from a high frequency region to a low frequency region. It is also clear that after the tape of the present invention was passed on a VTR, the running properties were not affected.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having provided thereon a magnetic layer, the magnetic layer comprising a first magnetic layer provided on the non-magnetic support containing ferromagnetic alloy particles having a specific surface area of 35 m²/g ($S_{BET}$) or more, and a second magnetic layer provided on the first magnetic layer containing hexagonal crystallized ferrite magnetic particles, wherein the second magnetic layer has a thickness of 0.5 μm or less, and the ratio of the thickness of said second magnetic layer to the thickness of said first magnetic layer is 1/10 or less.

2. The magnetic recording medium as claimed in claim 1, wherein the ferromagnetic alloy particles has a specific surface area of 45 m²/g ($S_{BET}$) or more.

3. The magnetic recording medium as claimed in claim 1, wherein the thickness of the first magnetic layer is 10 μm or less.

4. The magnetic recording medium as claimed in claim 1, wherein the thickness of the first magnetic layer is 5 μm or less.

5. The magnetic recording medium as claimed in claim 1, wherein said hexagonal crystallized ferrite particles are selected from the group consisting of berium ferrite, strontium ferrite, lead ferrite, substituted calcium ferrites, manganese bismuth or a hexagonal crystallized cobalt alloy thereof.

6. The magnetic recording medium as claimed in claim 1, wherein said hexagonal crystallized ferrite particles are selected from the group consisting of cobalt-substituted berium ferrite and cobalt-substituted strontium ferrite.

7. The magnetic recording medium as claimed in claim 1, wherein said hexagonal crystallized ferrite particles have a tabular diameter of 0.01 to 10 μm.

8. The magnetic recording medium as claimed in claim 7, wherein said hexagonal crystallized ferrite particles have a tabular diameter of 0.03 to 10 μm.

9. The magnetic recording medium as claimed in claim 1, wherein said hexagonal crystallized ferrite particles have a tabular thickness of 0.005 to 5 μm.

10. The magnetic recording medium as claimed in claim 9, wherein said hexagonal crystallized ferrite particles have a tabular thickness of 0.015 to 5 μm.

11. The magnetic recording medium as claimed in claim 1, wherein said hexagonal crystallized ferrite particles have a tabular ratio of 2 or more.

12. The magnetic recording medium as claimed in claim 11, wherein said hexagonal crystallized ferrite particles have a tabular ratio of 3 to 10.

13. The magnetic recording medium as claimed in claim 1, wherein the ratio of the thickness of said second magnetic layer to the thickness of said first magnetic layer is 1/20 or less.

14. The magnetic recording medium as claimed in claim 1, wherein the thickness of the second magnetic layer is 0.1 μm or less.

15. The magnetic recording medium as claimed in claim 14, wherein the thickness of the second magnetic layer is 0.03 μm or less.

16. The magnetic recording medium as claimed in claim 1, wherein the proportion of the binder to the ferromagnetic alloy particles is 8 to 400 parts by weight of the binder per 100 parts by weight of the ferromagnetic alloy particles.

17. The magnetic recording medium as claimed in claim 16, wherein the proportion of the binder to the ferromagnetic alloy particles is 10 to 200 parts by weight of the binder per 100 parts by weight of the ferromagnetic alloy particles.

18. The magnetic recording medium as claimed in claim 1, wherein the proportion of the binder to the hexagonal crystallized ferrite particles is 8 to 400 parts by weight of the binder per 100 parts by weight of the hexagonal crystallized ferrite particles.

19. The magnetic recording medium as claimed in claim 1, wherein the proportion of the binder to the hexagonal crystallized ferrite particles is 10 to 200 parts by weight of the binder per 100 parts by weight of the hexagonal crystallized ferrite particles.

* * * * *